2,852,479

PROCESS OF PREPARING AN AQUEOUS DISPERSION OF MELAMINE FORMALDEHYDE, PIGMENT, AND NON-IONIC SURFACE ACTIVE AGENT, PRODUCT OBTAINED AND PROCESS OF USING

Max Bender, Metuchen, and Charles F. Turner, New Brunswick, N. J., assignors to American Cyanamid Company, New York, N. Y., a corporation of Maine No Drawing. Application August 28, 1953
Serial No. 377,255

6 Claims. (Cl. 260—29.4)

The present invention relates to new textile treating compositions, which are stable pigmented dispersions of acid-colloid resins.

The use of synthetic resins for finishing textile materials has become increasingly important during recent years. In this application, resins may be classified broadly into two groups: thermosetting and thermoplastic. The thermosetting resins are usually employed as water-soluble monomers. Such thermosetting resins, when applied to fabrics and cured, result in shrinkage control and crease resistance. Due to their water-solubility, the thermosetting resin monomers will to some extent penetrate the fiber and polymerize within the fiber during the curing step. This polymerization of resin within the fiber is believed to be responsible for embrittlement of the fiber, and sometimes fibers so treated have been observed to suffer a serious loss in strength.

Because of their high molecular weight and large physical size, thermoplastic resins cannot diffuse through the outer wall of textile fibers and are deposited on the surface. Fabrics treated with thermoplastic resins (surface deposition on the fiber) are characterized by having increased weight or stiffness. The stiff or crisp finish on fabrics treated with thermoplastic resins is not particularly durable, however. Presumably, the resinous film around the fiber is broken or loosened by repeated flexing. Thermoplastic resins therefore are less effective in controlling shrinkage and improving crease resistance.

It has been known for some time that if the thermosetting resin is in the physical form of an acid colloid, fabrics treated therewith exhibit characteristics of both thermoplastic and thermosetting resins. Such treated fabrics possess stability and crease resistance with little decrease in tensile strength. It has been postulated that acid colloid resins form a film around each fiber, which film is crosslinked to the fiber molecule.

The advantages of treating textile fibers with acid coloid resins, however, have not been available in pigmented compositions. Pigments which are not compatible with acid colloid resins cause aggregation of the colloid particles, with a resulting breakdown of the dispersion and precipitation of the resin. Thus it has been necessary heretofore when coloring a textile fabric, to go through a two-step process. The textile was first dyed or colored in the normal manner, followed by application of the acid colloid to the colored fabric.

We have now discovered that in the presence of a non-ionic surface active agent, the acid colloid resins are stabilized to the extent that combination with pigment dispersions does not result in aggregation or precipitation. Even the most incompatible pigments which normally, due to their electrical charge or other physical properties, cause a rapid breakdown of a colloidal resin system, are stable in the presence of a non-ionic surface active agent for long periods of time. While neither the anionic nor the cationic surface active agents are effective, we find that various types of the non-ionic agents may be satisfactorily employed. In particular, the polyether alcohols obtained by reacting alkylene oxides, with alcohols, i. e., the reaction product of about 9 mols of ethylene oxide with p-hexadecyl and octyl phenol, respectively; the long chain fatty acid partial esters of hexitol anhydrides i. e., sorbitan monolaurate, sorbitan monooleate, sorbitan trioleate, reaction products of the above with about 20 mols of ethylene oxide and reaction products of the above with from 16 to 18 mols of ethylene oxide; and polyethylene ethers of fatty acids, i. e., the reaction product of oleyl alcohol with about 20 mols of ethylene oxide, are effective. We particularly prefer a non-ionic agent derived from dimeric fatty acids and ethylene oxide as described in U. S. Patent No. 2,606,199. Best results were obtained with a condensate of one mol dimerized soya fatty acids with about 260 to 280 mols ethylene oxide.

The acid-colloid resins employed in the compositions of the present invention are melamine-containing resins prepared, for example, according to the method described in U. S. Patent No. 2,345,543. We have discovered that if the pigment dispersion containing a non-ionic surface active agent is brought to a pH of between 6.6 and 8.1 by addition of an alkali such as triethanol amine prior to mixing with the resin colloid, the print strength is greatly improved. Our invention will be further illustrated by the following examples in which the parts are parts by weight.

Example 1

A pigment dispersion was prepared using 20 parts of the yellow pigment having the following formula:

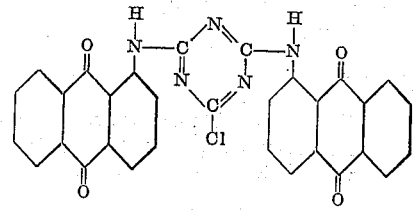

To a slurry of this pigment with 5 parts of glycerine-ethylene oxide condensate esterified with a mixture of lauric and myristic acid, water was added with rapid stirring to bring the total weight up to 100 parts.

Twenty-five parts of the above dispersion was diluted with 25 parts of water after which 50 parts of an 8.1% acetic acid colloid of trimethyl trimethylolmelamine was stirred into the pigment dispersions to form a colored pad bath. The acid colloid solution which contained the non-ionic agent was unchanged after standing in the laboratory for seven days.

A woolen fabric was given one dip and one nip in this acid colloid pigment dispersion, air-dried, cured 10 minutes at about 300° F., rinsed and again dried. A level yellow shade was obtained. If desired, the acetic acid colloid may be replaced with glycollic acid colloid or an equivalent acid colloid, such as lactic acid colloid. The procedure above may be repeated using only one part of the surface active agent and the results are generally similar. Other non-ionic surface active agents may be substituted for the polymerized glycerine ester.

Example 2

A pigment dispersion was prepared by the general procedure of Example 1, using the following materials:

Eighteen parts of the brown pigment having the following formula:

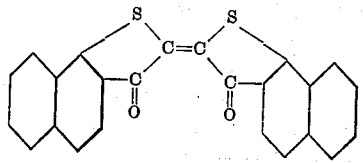

3 parts of dimeric fatty acids-ethylene oxide condensate containing 182 mols of ethylene oxide per mol of dimeric acid, and 79 parts of water.

A colored padding liquor was prepared as follows:

5.55 parts of the above dispersion
60.00 parts of 10% acetic acid colloid of trimethyl trimethylolmelamine resin
34.45 parts of water
___
100.00 parts total This pigment dispersion was fluid and showed no tendency to settle. It was used for coloring wool which had been pretreated with alkaline hypochlorite. After padding, drying, curing, rinsing and again drying, a bright uniform brown shade was obtained.

*Example 3*

A pigment dispersion was prepared as follows:

28.00 parts iron oxide red pigment ($Fe_2O_3$)
28.00 parts reaction product of about 9 mols of ethylene oxide with p-hexadecyl phenol
44.00 parts water
___
100.00 parts total This was dispersed with a high speed stirrer. The surface active agent gives the best results if it is first mulled with the pigment and a small amount of water.

A colored pad liquor was prepared as follows:

6.66 parts of the non-ionic pigment dispersion above
60.00 parts of the resin of Example 2
33.34 parts of water
___
100.00 parts total A stable pad liquor was obtained which could be used for coloring cotton or woolen textiles by the general procedure of Example 2.

*Example 4*

The procedure of Example 3 was repeated, except that the iron oxide red pigment was replaced with chrome oxide green (Color Index 1292) and the surface active agent was reduced from 28 parts to 10 parts. A good pigment dispersion was obtained which when incorporated into a colored pad bath, resulted in the formation of a stable colored pad liquor. Textiles treated in this bath, dried, cured, and finished as in Example 1, were colored a good green shade.

*Example 5*

A pigment dispersion was prepared as follows:

30.00 parts iron oxide red pigment ($Fe_2O_3$)
10.00 parts dimeric fatty acid-ethylene oxide condensate containing 182 mols ethylene
60.00 parts of water
___
100.00 parts total This was dispersed with a high speed stirrer. The surface active agent gives the best results if it is dissolved in part of the water before it is added to the pigment.

A colored pad liquor was prepared as follows:

6.60 parts of the non-ionic dispersion above
33.40 parts of water
60.00 parts of resin of Example 2
___
100.00 parts total A stable pad liquor was obtained which could be used for coloring cotton or woolen textiles by the general procedure of Example 2.

*Example 6*

The procedure of Example 5 was repeated except that the 10.00 parts of dimeric fatty acid-ethylene oxide condensate containing 182 mols ethylene oxide were replaced by 10.00 parts of dimeric fatty acid-ethylene oxide condensate containing 273 mols ethylene oxide. There was improvement in the dispersion of the pigment and in the padding liquor made from this dispersion. The pH of the pigment dispersion was 3.35 and that of the pad liquor 3.82. The pH of the 10% acetic acid colloid of trimethyl trimethylolmelamine resin was 3.66.

*Example 7*

The procedure of Example 6 was repeated except that 0.5 part of the water in the pigment dispersion was replaced by triethanolamine. The pH of the pigment dispersion prior to mixing with the acid colloid resin was 8.15 and after mixing was 3.84. A good stable dispersion was obtained which was superior to that of Example 6 and which when applied to fabrics gave a color of markedly improved strength and brightness over that obtained from the pad liquor of Example 6.

*Example 8*

A pigment dispersion of Permaton Orange was prepared using 20 parts of pigment prepared from 2,4 di-nitro aniline diazotized and coupled to beta-naphthol

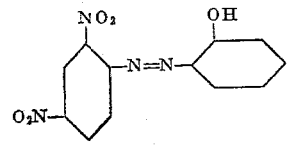

4 parts of the non-ionic agent of Example 2, 0.5 part of triethanolamine and 75.5 parts of water. An excellent dispersion was obtained which was stable a week after it has been formulated into a colored pad liquor with an acid-colloid resin.

*Example 9*

The procedure of Example 8 was repeated, using the organic pigment, Monastral Green (hexa deca chloro copper phthalocyanine).

The pigment dispersion prepared by this procedure was quite stable and when incorporated into a colored padding liquor using an acid colloid resin, resulted in an excellent colored pad liquor which gave bright strong shades on wool fabric. The blue pigment having Color Index 1106 may be substituted in the above formulation.

*Example 10*

A pigment dispersion was prepared by slurrying 30 parts of Mapico Yellow Light Lemon—No. 10 (yellow iron oxide) with 30 parts of a dimeric acid ethylene oxide condensate containing 273 moles of ethylene oxide, and rapid stirring with sufficient water to bring the total weight to 100 parts.

A colored pad liquor was made by mixing 666 parts of this dispersion with 6000 parts of a 10% acetic acid colloid of trimethyl trimethylolmelamine resin and 3334 parts of water. Excellent colors were obtained on wool with this stable dispersion.

The lemon pigment may be substituted with chrome green having Color Index 1291 or chrome oxide green having Color Index 1292.

We claim:

1. A stable dispersion of a pigment in a colloidal aqueous solution of a partially polymerized, positively charged melamineformaldehyde condensation product having a glass electrode pH value within the range of about 0.5 to about 3.5 when measured at 15% solids, said condensation product having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution; and characterized by the presence of a non-ionic surface active agent.

2. A stable dispersion of a pigment in a colloidal aqueous solution of a partially polymerized, positively charged melamineformaldehyde condensation product having a glass electrode pH value within the range of about 0.5 to about 3.5 when measured at 15% solids, said condensation product containing about 2–2.5 moles of combined formaldehyde to each mol of melamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution; and characterized by the presence of a non-ionic surface active agent.

3. A stable dispersion of a pigment in a colloidal aqueous solution of a partially polymerized, positively charged melamineformaldehyde condensation product containing at least 2, but not more than 4, moles of acetic acid for each mol of melamine, said condensation product containing about 2–2.5 moles of combined formaldehyde for each mol of melamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophosesis of the solution; and characterized by the presence of a non-ionic surface active agent.

4. A stable dispersion of a pigment in a colloidal aqueous solution of a partially polymerized, positively charged melamineformaldehyde condensation product containing about 1.6 to 2.5 moles of formic acid per mol of melamine, said condensation product containing about 2–2.5 moles of combined formaldehyde for each mol of melamine and having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution; and characterized by the presence of a non-ionic surface active agent.

5. A method for the preparation of stable pigment dispersions suitable for the coloring of textiles which comprises adding with stirring, a dispersion of a pigment and a non-ionic surface active agent characterized by a pH between 6.6 and 8, to a coloidal aqueous solution of a partially polymerized, positively charged melamineformaldehyde condensation product having a glass electrode pH value within the range of about 0.5 to about 3.5 when measured at 15% solids, said condensation product containing about 2–2.5 moles of combined formaldehyde to each mol of melamine and having a degree of polymerization less than that which characterizes gels and precipitates which are undispersible by agitation with water, but sufficient to bring the particles thereof within the colloidal range, said condensation product having a definite positive electrical charge as shown by its migration toward the cathode upon electrophosesis of the solution.

6. A process of coloring wool which comprises applying thereto a stable dispersion of a pigment in a colloidal aqueous solution of a partially polymerized, positively charged melamineformaldehyde condensation product having a glass electrode pH value within the range of about 0.5 to about 3.5 when measured at 15% solids, said condensation product having a degree of polymerization less than that which characterizes gels and precipitates which are undispersible by agitation with water but sufficient to bring the particles thereof within the colloidal range, said condensation product having a definite positive electrical charge as shown by its migration toward the cathode upon electrophoresis of the solution; and characterized by the presence of a non-ionic surface active agent.

References Cited in the file of this patent

UNITED STATES PATENTS

| 2,345,543 | Wohnsiedler et al. | Mar. 28, 1944 |
| 2,473,798 | Kienle et al. | June 21, 1949 |
| 2,609,307 | Fluck et al. | Sept. 2, 1952 |